(12) United States Patent
Hannon et al.

(10) Patent No.: US 8,062,551 B2
(45) Date of Patent: Nov. 22, 2011

(54) ANTIOZONANT BLENDS

(75) Inventors: Martin J. Hannon, Bethany, CT (US); Russell E. Malz, Jr., Glastonbury, CT (US); Joseph F. Stieber, Prospect, CT (US)

(73) Assignee: Chemtura Corporation, Middlebury, CT (US)

( * ) Notice: Subject to any disclaimer, the term of this patent is extended or adjusted under 35 U.S.C. 154(b) by 1403 days.

(21) Appl. No.: 11/416,980

(22) Filed: May 2, 2006

(65) Prior Publication Data

US 2007/0260000 A1    Nov. 8, 2007

(51) Int. Cl.
*C09K 15/16* (2006.01)
(52) U.S. Cl. .......................................... 252/401
(58) Field of Classification Search .................... 252/401
See application file for complete search history.

(56) References Cited

U.S. PATENT DOCUMENTS

| | | | |
|---|---|---|---|
| 3,163,616 A | 12/1964 | Stahly | |
| 3,304,284 A | 2/1967 | Cox | |
| 3,530,076 A | 9/1970 | Sparks et al. | 252/401 |
| 3,645,966 A | 2/1972 | Sparks et al. | 260/45.9 |
| 3,663,505 A | 5/1972 | Hoffman | 260/45.9 |
| 6,160,043 A | 12/2000 | Halladay | |
| 6,706,216 B1 | 3/2004 | Malz, Jr. et al. | 252/403 |
| 6,706,217 B2 | 3/2004 | Malz, Jr. et al. | 252/403 |

FOREIGN PATENT DOCUMENTS

| | | |
|---|---|---|
| EP | 084527 | 7/1983 |
| GB | 990469 | 4/1965 |

OTHER PUBLICATIONS

Kuczkowski J., *Oxidation Inhibition in Organic Materials*, vol. 1, Ch. 8, Part VII, Ed. Pospisil J. & Klemchuk, P.P., CRC Press 1990, pp. 275-287.

*Primary Examiner* — Patrick Niland
(74) *Attorney, Agent, or Firm* — Joseph Suhadolnik

(57) ABSTRACT

An antiozonant mixture is disclosed wherein said mixture comprises at least two compounds,
(A) at least one of which is of the structure

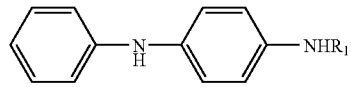

and
(B) at least one other of which is of the structure

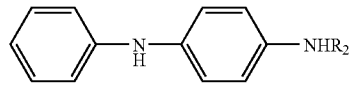

wherein
$R_1$ is a straight chain, branched, or cyclic alkyl group comprising from three to seven carbon atoms, and
$R_2$ is a straight chain, branched, or cyclic alkyl group comprising at least eleven carbon atoms.

4 Claims, No Drawings

ANTIOZONANT BLENDS

BACKGROUND OF THE INVENTION

1. Field of the Invention

The present invention relates to antiozonants. More particularly, the present invention relates to mixtures of certain N,N'-disubstituted p-phenylenediamines that are useful as antiozonants for rubber.

2. Description of Related Art

Unsaturated rubber is subject to attack and degradation by ambient ozone, which attacks and breaks the unsaturated carbon-carbon linkages of the polymer chain. This results in the formation of cracks that eventually cause the rubber article to fail. Rubber is also degraded by the action of heat and ambient oxygen, which causes weakening and failure of the rubber. Also, rubber articles that are used in dynamic applications, where they are repeatedly flexed, can fail prematurely owing to cracking brought about by the repeated flexing.

Materials that are particularly useful for the protection of rubber are those that combine the activity of antiozonants, antioxidants, and antifatigue agents, and that provide a high level of activity in each of these areas. It has been known for some time that N,N'-disubstituted para-phenylenediamines may be used to protect unsaturated rubbery polymers from the deleterious effects of ozone and oxygen. Examples of such antiozonants in common use include N-(1,3-dimethylbutyl)-N'-phenyl p-phenylenediamine; N-isopropyl-N'-phenyl-p-phenylenediamine; N-(1,4-dimethylpentyl)-N'-phenyl-p-phenylenediamine; N-(1-methyl-heptyl)-N'-phenyl-p-phenylenediamine; N-cyclohexyl-N'-phenyl-p-phenylenediamine; mixed diaryl-p-phenylenediamines; N,N'-diphenyl-p-phenylenediamine; N,N'-di-beta-naphthyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; and N-phenyl-N'-p-toluenesulfonyl-p-phenylenediamine.

Additionally, certain para-phenylenediamines can protect the rubber from cracking and failure to due to repeated flexing. These materials can also possess certain undesirable properties, such as a tendency to reduce the scorch safety of the rubber, or to produce an unsightly bloom on the surface of the rubber article. The most useful materials will be those that contribute minimally to these undesirable properties while maintaining a high level of antidegradant activity. Materials such as N-(1,3-dimethylbutyl)-N'-phenyl-p-phenylenediamine, (6-PPD), and N,N'-ditolyl-p-phenylenediamine are known to provide good protection to rubber. These materials are widely used in the rubber industry, but they suffer from the problems described above. In particular, 6-PPD will form a reddish brown bloom on the surface of rubber articles in which it is used. N,N'-ditolyl-p-phenylenediamine has only limited solubility in rubber that limits its useful level to about two parts per hundred parts of rubber.

A number of blends of p-phenylenediamines have been proposed with the objective of improving antiozonant activity. These are described in U.S. Pat. Nos. 3,530,076; 3,645,966; and 3,663,505.

U.S. Pat. Nos. 3,530,076 and 3,645,966 disclose synergistic antiozonant mixtures of from about 25% to about 75% by weight of N-isopropyl-N'-phenyl-p-phenylenediamine and correspondingly from about 75% to about 25% by weight of N,N'-di-sec-alkyl-p-phenylenediamine containing from 3 to 10 carbon atoms in each alkyl, and the use thereof in rubber.

U.S. Pat. No. 3,663,505 discloses antiozonant compositions for use in rubber comprising a mixture of N,N'-di-alkyl-p-phenylenediamine in which each alkyl contains 6 to 10 carbon atoms, N-phenyl-N'-alkyl-p-phenylenediamine in which the alkyl contains 3 to 6 carbon atoms, and N-phenyl-N'-alkyl-p-phenylenediamine in which the alkyl contains 7 to 10 carbon atoms.

The blends described in these patents all contain various amounts of N,N'-dialkyl-p-phenylenediamines. Although the compounds are protected, this blend is less desirable since N,N'-dialkyl p-phenylenediamines are known to cause a decrease in the scorch time of rubber compounds in which they are used. They also tend to be less persistent, since they are more easily oxidized by air. (See Kuczkowski, J., *Oxidation Inhibition In Organic Materials*, Vol. 1, Ch. 8, Part VII., Ed. Pospisil, J., & Klemchuk, P. P., CRC Press, 1990, p. 276-281.)

Blends are also used where the particular properties of two or more paraphenylenediamines are desired in a single product.

European Patent Application No. 084,527 discloses a process for preparing a mixture of two or more different N,N'-disubstituted paraphenylenediamines by the reductive alkylation of a nitrogen-containing compound selected from 4-nitrodiphenylamine, 4-aminodiphenylamine, paranitroaniline and phenylenediamine with two or more ketones wherein the ketones are charged sequentially and each ketone is reacted essentially to completion before charging the next.

U.S. Pat. Nos. 6,706,216 and 6,706,217 disclose liquid antiozonant mixtures obtained from the process comprising simultaneously reacting at least one unsubstituted and/or substituted paraphenylenediamine compound with a carbonyl compound mixture comprising acetone and at least one other carbonyl compound selected from the group consisting of ketones containing from 4 to about 12 carbon atoms, aldehydes containing from 1 to about 12 carbon atoms and mixtures thereof in the presence of a reductive alkylation catalyst. Rubber compositions containing the liquid antiozonant mixtures are also disclosed.

Additionally, N,N'-disubstituted p-phenylenediamines have been found to be useful as antioxidants for hydrocarbons other than rubber. Certain N,N'-disubstituted p-phenylenediamines are known to function as antioxidants for lubricating oils. U.S. Pat. No. 5,232,614 discloses lubricating oil compositions for use in environments where iron catalyzed oxidation can take place, which contain N-alkyl-N'-phenyl-p-phenylenediamines in which the alkyl groups contain up to 20 carbon atoms.

The disclosures of the above are incorporated herein by reference in their entirety.

SUMMARY OF THE INVENTION

It has now been found that mixtures of certain N,N'-disubstituted para-phenylenediamines are very active as antiozonants and antioxidants, and, in particular, as antifatigue agents. They also provide improved persistence of activity after aging. These materials have no deleterious effects on the processability of the rubber, and they do not modify other cured properties in any undesirable way.

More particularly, the present invention is directed to an antiozonant mixture comprising at least two compounds at least one of which is of the structure

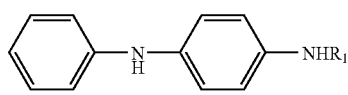

and at least one other of which is of the structure

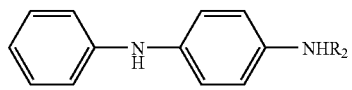

wherein $R_1$ is a straight chain, branched, or cyclic alkyl group comprising from three to seven carbon atoms, and $R_2$ is a straight chain, branched, or cyclic alkyl group comprising at least eleven carbon atoms.

In another aspect, the present invention is directed to a stabilized composition comprising:

(A) a rubber, and (B) an antiozonant mixture comprising at least two compounds at least one of which is of the structure

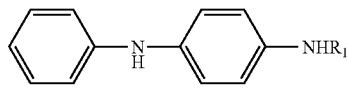

and at least one other of which is of the structure

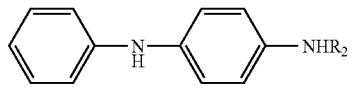

wherein $R_1$ is a straight chain, branched, or cyclic alkyl group comprising from three to seven carbon atoms, and $R_2$ is a straight chain, branched, or cyclic alkyl group comprising at least eleven carbon atoms.

In still another aspect, the present invention is directed to a method for stabilizing a rubber comprising mixing therewith a stabilizing amount of an antiozonant mixture comprising at least two compounds at least one of which is of the structure

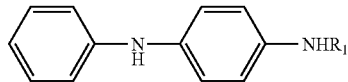

and at least one other of which is of the structure

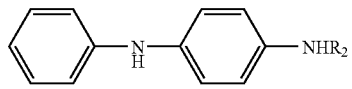

wherein $R_1$ is a straight chain, branched, or cyclic alkyl group comprising from three to seven carbon atoms, and $R_2$ is a straight chain, branched, or cyclic alkyl group comprising at least eleven carbon atoms.

DESCRIPTION OF THE PREFERRED EMBODIMENTS

As noted above, the antiozonant mixtures of the present invention comprise at least two compounds at least one of which is of the structure

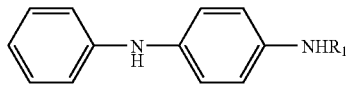

and at least one other of which is of the structure

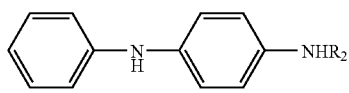

wherein $R_1$ is a straight chain, branched, or cyclic alkyl group comprising from three to seven carbon atoms, and $R_2$ is a straight chain, branched, or cyclic alkyl group comprising at least eleven carbon atoms.

With regard to the alkyl group $R_1$, it can, for example, be propyl, butyl, pentyl, hexyl, heptyl, isomers of the foregoing, such as, for example, isopropyl, tert.-butyl, neopentyl, and the like, or a cyclic group, such as cyclopropyl, cyclobutyl, cyclopentyl, cyclohexyl, cycloheptyl, methylcyclohexyl, and the like.

With regard to the alkyl group $R_2$, it can, for example, be undecyl, docecyl, tridecyl, tetradecyl, pentadecyl, hexadecyl, octadecyl, nonadecyl, eicosyl, heneicosyl, docosyl, tricosyl, tetracosyl, pentacosyl, triacontyl, pentatriacontyl, tetracontyl, pentacontyl, hexacontyl, dohexacontyl, tetrahexacontyl, heptacontyl, isomers of the foregoing, and the like, or a cyclic group, such as, 2-tert-butylcyclohexyl, 4-tert-butylcyclohexyl, cyclododecyl, 3,3,5,5-tetramethylcyclohexyl, cycloundecyl, 4-tert-amylcyclohexyl, and the like.

It was surprising and unexpected to discover that these mixtures of para-phenylenediamines have a synergistic antifatigue activity. The antifatigue activity of the blend is actually superior to that of an equal amount of any single component of the blend. The mixtures of para-phenylenediamines that exhibit these improved properties are comprised of two or more components. At least one of the components of the mixture is an N-alkyl-N'-phenyl-p-phenylene-diamine in which the alkyl group contains three to seven carbon atoms, (Type A), and at least one of the components of the mixture is an N-alkyl-N'-phenyl-p-phenylenediamine in which the alkyl group contains eleven or more carbon atoms, (Type B). The mixture may contain any number of type A or type B components, but must have at least one of each. Optionally, the mixture may contain other N-alkyl-N'-phenyl-p-phenylenediamines in which the alkyl groups have more or less than the specified number of carbons. The particular advantage of these blends of materials is that the rubber compounds containing them have superior resistance to flex cracking, particularly after being aged. At the same time, the rubber articles comprising the antiozonants of the present invention have good resistance to attack by ozone and the deleterious effects of heat and oxygen, resistance that is approximately equivalent to that of articles produced with conventional antiozonants.

Compounds that may be used as the A component of the blend, include, for example: N-isopropyl-N'-phenyl-p-phenylenediamine, N-sec-butyl-N'-phenyl-p-phenylenediamine, N-isobutyl-N'-phenyl-p-phenylenediamine, N-(1,2-dimethyl)propyl-N'-phenyl-p-phenylenediamine, N-(3-pentyl)-N'-phenyl-p-phenylenediamine, N-cyclopentyl-N'-phenyl-p-phenylenediamine, N-(2-hexyl)-N'-phenyl-p-phenylenediamine, N-(1,3-dimethylbutyl)-N'-phenyl-p-phenylenediamine, N-cyclohexyl-N'-phenyl-p-phenylenediamine, N-(1,4-dimethylpentyl)-N'-phenyl-p-phenylenediamine, and the like.

Compounds that may be used as the B component of the blend, include, for example: N-(1-methyldecyl)-N'-phenyl-p-phenylenediamine, N-(2-tert-butylcyclohexyl)-N'-phenyl-p-phenylenediamine, N-(4-tert-butylcyclohexyl)-N'-phenyl-p-phenylenediamine. N-cyclododecyl-N'-phenyl-p-phenylenediamine, N-(3,3,5,5-tetramethylcyclohexyl)-N'-phenyl-p-phenylenediamine, N-decyl-N'-phenyl-p-phenylenediamine, N-(2-decyl)-N'-phenyl-p-phenylenediamine, N-(3-decyl)-N'-phenyl-p-phenylenediamine, N-(4-decyl)-N'-phenyl-p-phenylenediamine, N-undecyl-N'-phenyl-p-phenylenediamine, N-cycloundecyl-N'-phenyl-p-phenylenediamine, N-(4-tert-amylcyclohexyl)-N'-phenyl-p-phenylenediamine, N-(1-pentylhexyl)-N'-phenyl-p-phenylenediamine, N-cyclododecyl-N'-phenyl-p-phenylenediamine, N-(4-ethyl-1-methyloctyl)-N'-phenyl-p-phenylenediamine, and the like.

The antiozonant mixtures of the present invention can be added to the rubber at levels from 0.5 phr (parts per hundred of rubber), up to 8 phr or more, depending on the relative amounts of the components in the particular blend utilized and on the rubber polymer or blend of polymers. The most useful levels range from 1.0 to 4 phr. Preferably, all of the components B are added at a combined total level of 0.05 to 6 phr, more preferably at a combined total level of 0.50 to 3.0 phr.

The proportions of the type A components and type B components can vary according to the particular end use application of the rubber article and the type of rubber polymer(s) used. The useful mixtures will have more than about 10% by weight and less than about 90% by weight of type B components. The most useful mixtures will have between about 30 and about 70% by weight of type B components.

The antiozonant mixtures of this invention are used with unsaturated rubbery polymers that are subject to attack by ozone. Such rubbery polymers include natural rubber, styrene-butadiene copolymers, polybutadiene, polyisoprene, polychloroprene, polyisobutylene, acrylonitrile-butadiene copolymers and mixtures of these polymers. The antiozonant mixtures will be useful for rubbers that are subject to dynamic stress during service. The rubber compositions containing the antiozonant mixtures are particularly useful when formed as, for example, tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, windshield wiper blades and the like. Preferably, the rubber compositions containing the antiozonant mixture of this invention are advantageously used in a tire as a component of any or all of the thermosetting rubber-containing portions of the tire. These include the tread, sidewall, and carcass portions of, for example, a car tire, truck tire, passenger tire, off-road vehicle tire, high speed tire and the like that also contain many different reinforcing layers therein. These components typically contain more than one thermosetting rubber polymer in a blend that must be protected from ozone degradation as well as oxidative attack. The mixtures will be especially useful in natural rubber and natural rubber blends used to make tires, particularly sidewalls.

The mixtures can be added to the rubber as part of the normal mixing operations, for example, using an internal mixer or an open mill. The chemicals that make up the blend may be added to the rubber either as separate ingredients or they may be premixed and added as a mixture. Optionally, they may be manufactured as a mixed composition. Typically, they are mixed with the rubber(s) in a non-productive mixing step after the incorporation of fillers.

The mixtures may be used along with the usual compounding ingredients, such as extending oils and wax. Fillers, such as carbon black, silica, alumina or clay, may be included as well. The rubber may be cured with the usual vulcanizing ingredients, such as zinc oxide, stearic acid or its zinc salt, accelerators, and sulfur or sulfur donors.

The components of the antiozonant mixtures employed in the practice of the present invention may be made by techniques well known to those experienced in the art. Some such components may be obtained from commercial sources, examples of which are shown below.

The following examples describe procedures used to prepare some of the other materials that are used in this invention. Unless otherwise indicated, all parts are by weight.

EXAMPLE 1

Preparation of N-(1-methyldecyl)-N'-phenyl-p-phenylenediamine

Para-aminodiphenylamine (184 grams, 1.00 mole), 2-undecanone (221 grams, 1.30 moles) and 6.0 grams (dry weight) of carbon supported platinum sulfide catalyst were charged to a one-liter stirred autoclave. The vessel was sealed, pressurized first with nitrogen and then with hydrogen gas, stirred, and heated to 120° C. until the reaction was completed, as indicated by the cessation of hydrogen absorption. The vessel was cooled, vented, and the contents removed. The catalyst was removed by filtration and the water was separated. The excess ketone reactant was removed by heating in vacuo.

EXAMPLE 2

Preparation of a mixture of N-isopropyl-N'-phenyl-p-phenylenediamine, N-(1,3-dimethylbutyl)-N'-phenyl-p-phenylenediamine, and N-(1-methyldecyl)-N'-phenyl-p-phenylenediamine Para-aminodiphenylamine (184 grams, 1.00 mole), 2-undecanone (63.0 grams, 0.37 mole), methyl isobutyl ketone (37.1 grams, 0.37 mole), acetone (21.5 grams, 0.37 mole), and 12.0 grams (dry weight) of carbon supported platinum sulfide catalyst were charged to a one-liter stirred autoclave. The vessel was sealed, pressurized first with nitrogen and then with hydrogen gas, stirred and heated to 130° C. until the reaction was completed, as indicated by the cessation of hydrogen absorption. The vessel was cooled, vented, and the contents removed. The catalyst was removed by filtration and the water was separated. The excess ketone reactant was removed by heating in vacuo.

The following examples illustrate the utility of this invention. The materials used in the evaluations are listed below.

Natural Rubber, SMR CV60, Standard Malaysian Rubber

Polybutadiene BR 1203

Carbon black, N339, N660

Extending Oil, Calsol 8240

Zinc Oxide, produced by the Zinc Corporation of America

Stearic Acid, produced by Monson Chemical.

6-PPD, N-(1,3-dimethylbutyl)-N'-phenyl-p-phenylenediamine, Flexzone® 7P, produced by the Chemtura Corporation IPPD, N-isopropyl-N'-phenyl-p-phenylenediamine, Flexzone® 3C, produced by the Chemtura Corporation Sulfur, Crystex® 80%

TBBS, N-tert-butylbenzothiazolyl-2-sulfenamide, Delac® NS, produced by the Chemtura Corporation The rubber polymers, carbon black fillers, and oil were mixed in a Banbury 1A internal mixer to make a masterbatch. Portions of this masterbatch were taken and zinc oxide, stearic acid, and the antiozonant test material were mixed in a Brabender lab mixer. The rubber compounds were sheeted on a warm mill and sulfur and an accelerator were mixed in a Brabender lab mixer. The rubber compounds were sheeted out on a warm mill and test pieces were cut out and cured in a heated press at the temperatures and times shown in the Tables.

Standard ASTM test methods were used for measurement of Mooney viscosity (D3346-90), ODR cure characteristics (D2084-92), stress-strain (D412-92), tear strength (D624-91), and Shore A hardness (D2240-91).

Heat aging was carried out in hot air ovens at the temperatures and time conditions shown in the Tables.

Ozone resistance was tested by flexing test pieces, approximately 0.080 inch thick, at 40° C., in an ozone chamber at an ozone concentration of 20 pphm at 20 cycles per minute. Ozone resistance was also tested by vulcanizing test specimens on a belt and continuously flexing the belt in an ozone chamber at 40° C. in an ozone concentration of 50 pphm.

The Monsanto Flex Fatigue to Failure tests were run at room temperature using a #14 cam, (100% strain).

The masterbatch shown below was used in all of the following examples.

| | |
|---|---|
| SMR CV60 | 55.00 |
| BR 1203 | 45.00 |
| N339 | 30.00 |
| N660 | 20.00 |
| Oil | 7.00 |
| Total Masterbatch 1 | 157.00 |

The following ingredients were added in the second non-productive step.

| | |
|---|---|
| Masterbatch 1 | 157.00 |
| Zinc Oxide | 3.00 |
| Stearic Acid | 1.00 |
| Antiozonant | As Shown |
| Total Masterbatch 2 | 161.00 |

The curatives were added in the last productive mixing step.

| | |
|---|---|
| Masterbatch 2 | 161.00 |
| Sulfur | 2.00 |
| TBBS | 1.00 |
| Total | 164.00 |

EXAMPLE 3

In this example, the degree of protection provided by a blend containing approximately equal molar amounts of two type A components and one type B component, (Test material 2) is compared to the degree of protection provided by each of the individual components.

The test compounds were prepared by incorporating the antiozonants at the part levels shown into the Masterbatch 1, descibed above, along with the indicated amounts of zinc oxide and stearic acid, to make Masterbatch 2. The curatives were incorporated in a third mixing step, and the specimens were sheeted out on a mill and cured in a heated press at the temperatures and times indicated. The same is true of the stress-strain properties of the cured compounds. The data show that the cured properties of the compounds made with the blend are at least equivalent to those of compounds made with individual components. In the table below, Ex. 1 and Ex. 2, respectively, refer to the products of Examples 1 and 2 above.

| | A<br>Blank | B<br>6-PPD | C<br>IPPD | D<br>Ex. 1 | E<br>Ex. 2 |
|---|---|---|---|---|---|
| Antiozonant, phr | | 2 | 1.69 | 2.52 | 2.05 |
| Processing Properties | | | | | |
| Rheometer - ODR 2000 @ 160° C. | | | | | |
| ML, in-lb. | 4.6 | 5.0 | 4.9 | 4.6 | 4.9 |
| MH, in-lb. | 40.8 | 41.0 | 40.3 | 39.7 | 40.1 |
| ts2, minutes | 5.1 | 4.5 | 4.4 | 4.5 | 4.5 |
| t50, minutes | 7.1 | 6.3 | 6.0 | 6.2 | 6.2 |
| t90, minutes | 8.7 | 7.7 | 7.5 | 7.6 | 7.7 |
| Stress/Strain | | | | | |
| Cure Time @ 160° C. | 12.5' | 12.5' | 12.5' | 12.5' | 12.5' |
| 100% Modulus, Mpa | 2.4 | 2.3 | 2.2 | 2.2 | 2.2 |
| 300% Modulus, Mpa | 11.1 | 10.5 | 10.2 | 10.3 | 10.2 |
| Tensile, Mpa | 13 | 13.6 | 13.9 | 13.1 | 11.8 |
| % Elongation | 336 | 361 | 374 | 355 | 330 |
| Hardness, Shore A | 59 | 59 | 58 | 57 | 57 |
| Dynamic Ozone Resistance - Ozone Belt, 50 pphm O3 40° C. | | | | | |
| Rating at 24 hours | 10 | 10 | 10 | 10 | 10 |
| Rating at 48 hours | 9 | 10 | 10 | 10 | 10 |
| Rating at 168 hours | 4 | 10 | 9 | 10 | 10 |
| Rating at 216 hours | 4 | 9 | 9 | 9 | 10 |
| Rating at 264 hours | 4 | 9 | 9 | 9 | 9 |
| Rating at 336 hours | 3 | 8 | 9 | 7 | 8 |
| Monsanto Fatigue to Failure #14 cam, kilocycles to failure | | | | | |
| Unaged | 58.6 | 204.2 | 212.8 | 235.7 | 297.3 |
| Aged two weeks @ 70° C. | 5.6 | 81.6 | 79.6 | 86.5 | 100.6 |

The data shown in this example demonstrate that the mixture of antiozonants used according to this invention produces a rubber coupound that is at least equivalent to that produced by conventional antiozonants used individually. As shown by the rheometer data, the extent of the cure as indicated by the torque, and the cure time, of the experimental material, Compound E, are virtually indistinguishable from those of the individual antiozonants used in the blend.

The dynamic ozone resistance of the rubber compound made with the blend is also at least equivalent to that of the compounds made with individual components. In this particular test, a numerical rating is given to the exposed samples. A high number indicates no cracks or a small number of small cracks. A low number indicates a large number of large cracks.

The resistance to flex cracking as shown in the Fatigue to Failure test shows the advantage of the mixture. The initial resistance to fatigue failure of Compound E is dramatically higher than that of the individual components, Compounds B, C, and D. That the resistance of the blend is higher than that of the components, used at the same molar amount, indicates an unexpected synergy of activity, both before and after aging.

EXAMPLE 4

In this example, the degree of protection provided by a blend containing approximately equal molar amounts of two type A components and one type B component (Test material 2) is compared to the degree of protection provided by 6-PPD, a widely used commercial material, and to the pure type B component.

As seen in the previous example, the processing properties as measured by the rheometer are the same for all the compounds containing antiozonants. The stress/strain properties of the unaged compounds are also the same for all of the compounds containing antiozonants. The data on the compounds that were aged at 70° C. for two weeks in air show that the mixture of antiozonants protects rubber against degradation as well as the commercial single component product.

The Fatigue to Failure test once again shows that the mixture has enhanced antifatigue activity compared to single components.

|  | Blank | 6-PPD | Ex. 1 | Ex. 2 |
|---|---|---|---|---|
| PHR |  | 2.00 | 2.52 | 2.05 |
| Rheometer - ODR 2000 @ 160° C. | | | | |
| ML | 6.2 | 6.5 | 6.2 | 6.2 |
| MH | 39.7 | 38.3 | 37.3 | 37.6 |
| ts2 | 4.6 | 3.8 | 3.8 | 3.8 |
| t50 | 7.3 | 6.2 | 6.0 | 5.9 |
| t90 | 9.0 | 7.7 | 7.5 | 7.4 |
| Stress/Strain | | | | |
| Cure Times @ 160° C. | 12.5' | 12.5' | 12.5' | 12.5' |
| 300% Modulus, Mpa | 11.6 | 10.2 | 9.6 | 10.3 |
| Tensile, Mpa | 20.2 | 22.7 | 22.3 | 22.8 |
| % Elongation | 470 | 530 | 550 | 540 |
| Hardness, Shore A | 63 | 60 | 60 | 60 |
| Stress/Strain - Aged two weeks @ 70° C. | | | | |
| 300% Modulus, Mpa |  | 15.5 | 14.6 | 15.1 |
| Tensile, Mpa | 9.1 | 19.7 | 18.6 | 19.3 |
| % Ret. of Tensile | 45 | 87 | 83 | 85 |
| % Elongation | 180 | 370 | 370 | 380 |
| % Ret. of Elongation | 38 | 70 | 67 | 70 |
| Hardness, Shore A | 66 | 67 | 67 | 68 |
| Dynamic Flex Resistance - Monsanto Fatigue to Failure, #14 cam, kilocycles to failure | | | | |
| Unaged | 63.3 | 217.6 | 185.4 | 228.4 |
| Aged two weeks @ 70° C. | 24.7 | 120.7 | 112.7 | 135.8 |

In view of the many changes and modifications that can be made without departing from principles underlying the invention, reference should be made to the appended claims for an understanding of the scope of the protection to be afforded the invention.

What is claimed is:
1. An antiozonant mixture consisting essentially of
(A) at least one compound of the structure

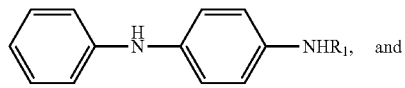

(B) from 30% to 70% by weight, based on the total weight of compounds A and B, of at least one compound of the structure

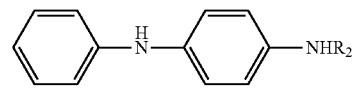

wherein $R_1$ is straight chain or branched butyl, pentyl, hexyl or heptyl or is cyclopropyl, cyclobutyl, cyclopentyl, cyclohexyl, cycloheptyl, methylcyclohexyl, and $R_2$ is a straight chain, branched, or cyclic alkyl group comprising at least eleven carbon atoms.

2. The mixture of claim 1 wherein compound A is selected from the group consisting of N-sec-butyl-N'-phenyl-p-phenylenediamine, N-isobutyl-N'-phenyl-p-phenylenediamine, N-(1,2-dimethyl)propyl-N'-phenyl-p-phenylenediamine, N-(3-pentyl)-N'-phenyl-p-phenylenediamine, N-cyclopentyl-N'-phenyl-p-phenylenediamine, N-(2-hexyl)-N'-phenyl-p-phenylenediamine, N-(1,3-dimethylbutyl)-N'-phenyl-p-phenylenediamine, N-cyclohexyl-N'-phenyl-p-phenylenediamine, and N-(1,4-dimethylpentyl)-N'-phenyl-p-phenylenediamine.

3. The mixture of claim 1 wherein compound B is selected from the group consisting of N-(1-methyldecyl)-N'-phenyl-p-phenylenediamine, N-(2-tert-butylcyclohexyl)-N'-phenyl-p-phenylenediamine, N-(4-tert-butylcyclohexyl)-N'-phenyl-p-phenylenediamine, N-cyclododecyl-N'-phenyl-p-phenylenediamine, N-(3,3,5,5-tetramethylcyclohexyl)-N'-phenyl-p-phenylenediamine, N-decyl-N'-phenyl-p-phenylenediamine, N-(2-decyl)-N'-phenyl-p-phenylenediamine, N-(3-decyl)-N'-phenyl-p-phenylenediamine, N-(4-decyl)-N'-phenyl-p-phenylenediamine, N-undecyl-N'-phenyl-p-phenylenediamine, N-cycloundecyl-N'-phenyl-p-phenylenediamine, N-(4-tert-amylcyclohexyl)-N'-phenyl-p-phenylenediamine, N-(1-pentylhexyl)-N'-phenyl-p-phenylenediamine, N-cyclododecyl-N'-phenyl-p-phenylenediamine, and N-(4-ethyl-1-methyloctyl)-N'-phenyl-p-phenylenediamine.

4. The mixture of claim 1 wherein A comprises N-(1,3-dimethylbutyl)-N'-phenyl-p-phenylenediamine and B comprises N-(1-methyldecyl)-N'-phenyl-p-phenylenediamine.

* * * * *